United States Patent Office 2,753,128
Patented July 3, 1956

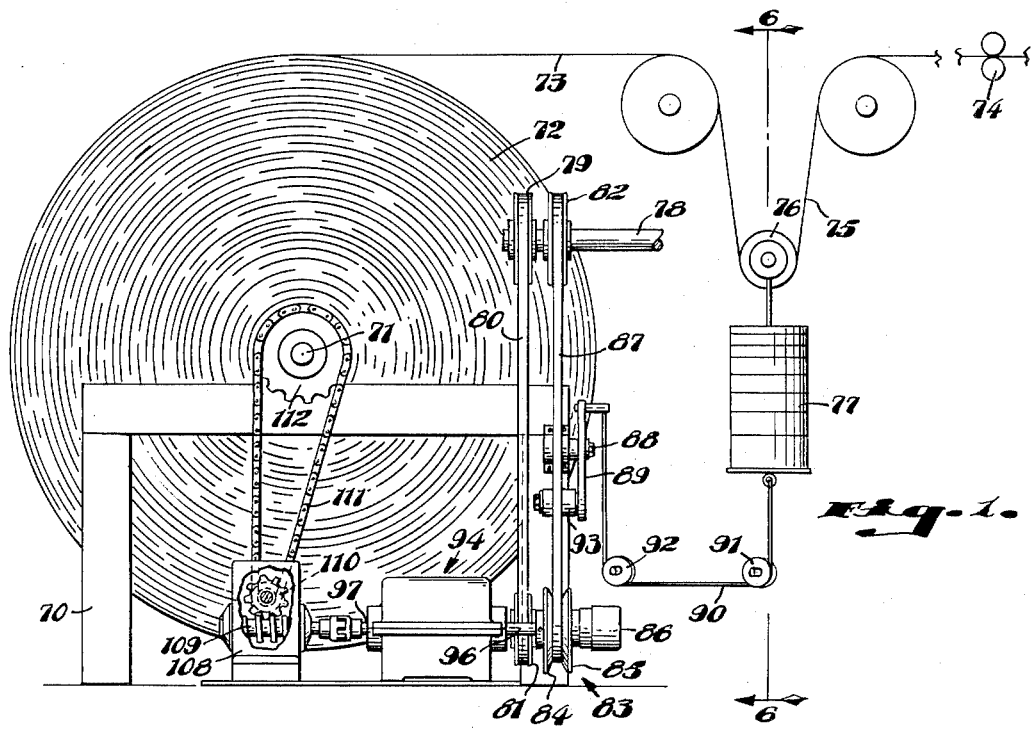
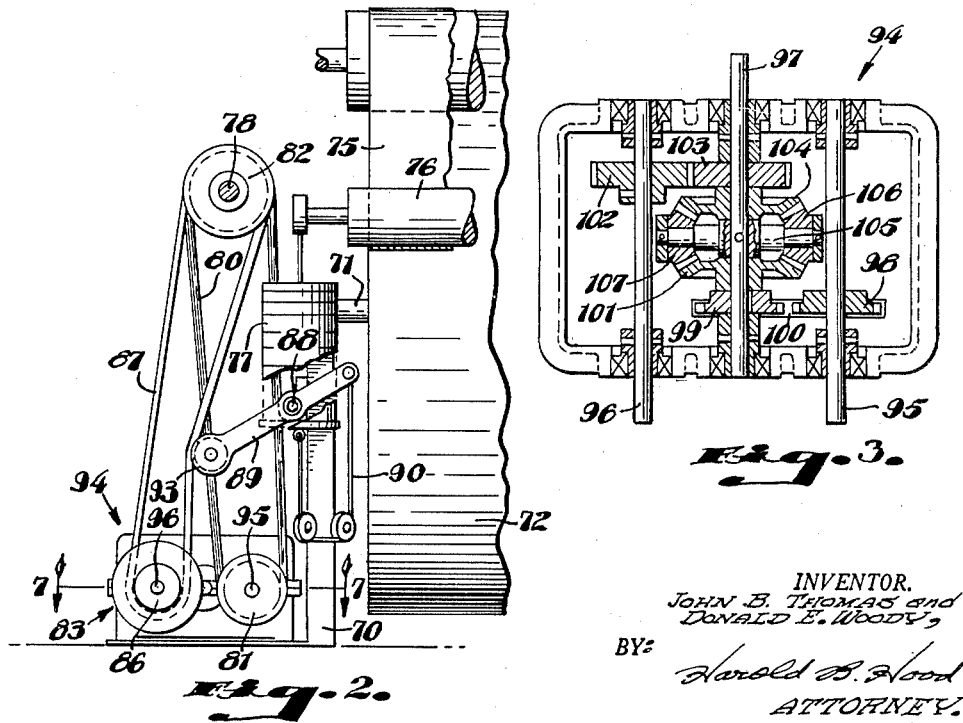

2,753,128

DIFFERENTIAL CONTROL FOR BEAM LET-OFF DRIVE OR THE LIKE

John B. Thomas, Belmont, and Donald E. Woody, Medford, Mass., assignors, by mesne assignments, to The Reliance Electric and Engineering Company, Cleveland, Ohio, a corporation of Ohio Application December 31, 1952, Serial No. 328,956

5 Claims. (Cl. 242—75)

The present invention relates to a drive for a storage roll for flexible material, and the primary object of the invention is to provide a mechanism which, in response to tendencies toward variation in a condition existing in a length of such material, such as, for instance, tension, will automatically vary the speed at which such a storage roll is driven, either for winding or for unwinding of the material, in order to maintain such condition against substantial effective variation.

A further object of the invention is to provide novel means, involving a differential gear, for driving a rotary element at varying speeds in response to variations in the position of a material-effected member.

The invention has been particularly designed for use, and has been illustrated and will be described in connection, with a beam let-off drive; but it will be clear that the invention is capable of use in many other environments.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a side elevation of an embodiment of the control of the present invention;

Fig. 2 is an end elevation thereof fragmentarily and somewhat diagrammatically illustrated; and Fig. 3 is an enlarged section taken substantially on the line 7, 7 of Fig. 2.

Referring more particularly to the drawings, we have shown a frame 70 supporting a storage roll 71 upon which is wound a mass of flexible material 72 such as, for instance, warp yarns, from which a run 73 extends to suitable forwarding means suggested at 74, through which the material is forwarded at constant velocity to a point of use (not shown). A bight 75 is interposed in the length of the run 73, and a dance roll 76 is supported in said bight. A suitable weight 77 depends from the dance roll 76.

A shaft 78 is suitably driven at a constant ratio with respect to the forwarding means 74. A pulley 79 on the shaft 78 is connected by a belt 80 to drive a pulley 81 at constant ratio; and a pulley 82 is connected by a belt 87 to drive a resiliently expansible pulley 83, comprising a fixed disc 84, a mating disc 85 axially adjustable toward and away from the disc 84, and a spring unit 86 constantly urging the disc 85 toward the disc 84. The pulleys 82 and 83 and the belt 87 constitute a variable ratio drive means. Adjacent thhe belt 87, a fulcrum 88 supports a lever 89; and a cable 90 extends from the weight 77 around guide pulleys 91 and 92 to be anchored on one end of the lever 89. The arrangement is such that the opposite end of said lever 89, which carries a roller 93, moves on a line intersecting the plane common to the axes of the pulleys 82 and 83, when said lever is oscillated about said fulcrum.

A differential gear, indicated generally by the reference numeral 94, comprises a first input member 95 upon which the pulley 81 is mounted, a second input member 96 upon which the pulley 83 is mounted, and an output member 97. A sprocket 98 is fixed to the shaft 95, a sprocket 99 is freely mounted on the shaft 97, and a chain 100 provides a driving connection between said sprockets, the sprocket 99 being fixed with respect to a bevelled gear 101. A spur gear 102 is fixed to the shaft 96, a spur gear 103 is freely mounted on the shaft 97 and meshes with the gear 102, and a bevelled gear 104 is fixed with respect to the spur gear 103. A carrier 105 is pinned to the shaft 97 and carries bevelled gears 106 and 107 meshing with the gears 101 and 104.

It will be seen that, so long as the shafts 95 and 96 are driven at equal velocities and in the same direction, the shaft 97 will be held against rotation; but that, when either of the input elements exceeds the speed of the other, the shaft 97 will be driven at a velocity measured by the differential between the speeds of the input members.

A unit 108 is drivingly connected to the output element 97 of the gear 94, and comprises a worm 109 meshing with a worm wheel 110 which drives a sprocket connected by a chain 111 to a sprocket 112 on the roll 71.

As material is drawn from the mass 72, at constant lineal velocity, the effective diameter of the mass 72 is reduced. Since the roll 71 is moving at constant angular velocity, it exerts a drag or hold-back tendency upon the material. Thereby, the bight 75 will be shortened, lifting the dance roll 76 and moving the lever 89 in a clockwise direction. Thus, the belt 87 will be drawn more deeply between the discs 84 and 85 to increase the velocity of the shaft 96. Since the shaft 95 is driven at constant velocity, the effect of this movement of the lever 89 will be to increase the velocity of the shaft 97, thus increasing the angular velocity of the roll 71. In effect, then, the angular velocity of the roll 71 is progressively increased at a rate such as to maintain the tension in the strand section 73 always constant throughout the unwinding cycle.

It will be clear that the illustrated mechanism could be used, also, in a winding operation. In such case, the forwarding means 74 would, of course, move the material toward, instead of away from, the storage roll at constant velocity; and the control mechanism would operate to reduce the angular velocity of the roll 71 progressively, under the domination of variations, or rather tendencies toward variation, in the tension in the section 73 of the material. The dance roll 76 would move downwardly, while the bight 75 progressively elongates, to permit the lever 89 to move in a counter-clockwise direction, during such winding operation.

The variable-ratio drive means comprises the pulley pair 82, 83 and the constant ratio drive means comprises the pulley pair 79, 81.

We claim as our invention:

1. Means for automatically controlling the rate of rotation of a storage roll for flexible material comprising, in combination with such a roll, a differential gear including a first input element, a second input element and an output element, means connecting said input elements to drive said output element at a rate measured by the differential between the speeds of said input elements, means for driving said first input element, means for driving said second input element at speeds variable with respect to the speed of said first input element, irreversible means connecting said output element to drive said roll, a length of flexible material wound on said roll, means for withdrawing said material from said roll, and means, movable in response to variations in tension within a portion of said material retreating from said roll, connected to control the speed at which said second input element is driven.

2. Means for automatically controlling the rate of rotation of a storage roll for flexible material comprising, in combination with such a roll, a length of such material wound on said roll, means for forwarding said material at constant lineal velocity, a differential gear including a first input element, a second input element, and an output element, means connecting said input elements to control the speed of said output element in accordance with the differential between the speeds of said input elements, means for driving said first input element, means for driving said second input element at speeds variable with respect to the speed of said first input element, a worm driven by said output element, a worm wheel meshing with said worm, means providing a fixed-ratio drive connection between said worm wheel and said roll, and means, movable in response to variations in tension within a portion of said material near said roll, connected to control the speed at which said second input element is driven.

3. Means for automatically controlling the rate of rotation of a storage roll for flexible material comprising, in combination with such a roll, a length of such material wound on said roll, means for forwarding said material at constant lineal velocity, a differential gear including a first input element, a second input element, and an output element, means connecting said input elements to control the speed of said output element in accordance with the differential between the speeds of said input elements, rotary means driven at a constant ratio with respect to said material-forwarding means, constant-ratio drive means connecting said rotary means to drive said first input element, variable-ratio drive means connecting said rotary means to drive said second input element, a device bearing upon said material near said roll and movable in response to variations in a condition existing in said material, means connecting said device to vary the ratio of said variable-ratio drive means in response to movement of said device, and means including an irreversible worm reduction gear providing a fixed-ratio drive connection between said output element and said roll.

4. Means for automatically controlling the rate of rotation of a storage roll for flexible material comprising, in combination with such a roll, a length of such material wound on said roll, means for forwarding said material at constant lineal velocity, a differential gear including a first input element, a second input element, and an output element, means connecting said input elements to control the speed of said output element in accordance with the differential between the speeds of said input elements, a shaft driven at a constant ratio with respect to said material-forwarding means, a first pulley pair including a fixed-effective-diameter pulley on said shaft and a fixed-effective-diameter pulley on said first input element, an endless member providing a driving connection between the pulleys of said first pair, a second pulley pair including a pulley on said shaft and a pulley on said second input element, at least one of the pulleys of said second pulley pair being a variable-effective-diameter pulley, an endless member providing a driving connection between the pulleys of said second pair, a device bearing upon said material near said roll and movable in response to variations in the tension existing in said material, means connecting said device to vary the effective diameter of said variable-effective-diameter pulley in response to movement of said device, and means including an irreversible worm reduction gear providing a fixed-ratio drive connection between said output element and said roll.

5. Means for automatically controlling the rate of rotation of a storage roll for flexible material comprising, in combination with such a roll, a length of such material wound on said roll, means for forwarding said material at constant lineal velocity, a differential gear including a first input element, a second input element, and an output element, means connecting said input elements to control the speed of said output element in accordance with the differential between the speeds of said input elements, a shaft driven at a constant ratio with respect to said material-forwarding means, a first pulley pair including a fixed-effective-diameter pulley on said shaft and a fixed-effective-diameter pulley on said first input element, an endless member providing a driving connection between the pulleys of said first pair, a second pulley pair including a pulley on said shaft and a pulley on said second input element, one of the pulleys of said second pair being a fixed-effective-diameter pulley and the other pulley of said second pair being a resiliently-expansible V-pulley, an endless V-belt providing a driving connection between the pulleys of said second pair, a device bearing upon said material and movable in response to variations in the tension existing in said material, a lever mounted adjacent said V-belt between the pulleys of said second pair and carrying a roller bearing upon said V-belt, said lever being oscillable to shift said roller on a line intersecting the plane common to the axes of the pulleys of said second pair, means connecting said device to shift said lever in response to movement of said device, and means providing a driving connection between said output element and said roll.

References Cited in the file of this patent

UNITED STATES PATENTS

| | | |
|---|---|---|
| 1,455,976 | Stevens | May 22, 1923 |
| 2,142,544 | Whitener et al. | Jan. 3, 1939 |
| 2,175,551 | Perry | Oct. 10, 1939 |
| 2,384,879 | Rodansky et al. | Sept. 18, 1945 |
| 2,514,824 | Young | July 11, 1950 |